United States Patent Office 2,984,643
Patented May 16, 1961

2,984,643
POLYMERIZABLE COMPOSITION COMPRISING A VINYL MONOMER AND AN UNSATURATED POLYESTER CONTAINING BENZYL ETHER GROUPS

Gunther Nischk, Leverkusen, Otto Bayer, Leverkusen-Bayerwerk, Hans Holtschmidt, Koln-Stammheim, and Heinrich Meckbach, Leverkusen-Bayerwerk, Germany, assignors to Farbenfabriken Bayer Aktiengesellschaft, Leverkusen, Germany, a corporation of Germany No Drawing. Filed Jan. 23, 1957, Ser. No. 635,571

Claims priority, application Germany Jan. 28, 1956

12 Claims. (Cl. 260—45.4)

The present invention relates to polymerizable composition comprising a liquid ethylenic monomer and a copolymerizable polyester being modified with benzyl-ether derivatives.

The copolymerization of ethylenically unsaturated polyesters obtained from α-β-ethylenically unsaturated polybasic acids and dihydric alcohols with liquid monomeric polymerizable compounds containing an ethylenic linkage, such as vinyl or allyl compounds, has been known for a relatively long time (compare U.S. Patent 2,255,313). α,β-Unsaturated dicarboxylic acids or their anhydrides, such as for example maleic acid, fumaric acid or maleic anhydride, have been used as unsaturated components for the production of these polyesters. Adipic acid, succinic acid, phthalic acid, tetrachlorophthalic acid and other acids which are devoid of non-benzenoid unsaturation, or their anhydrides, which can likewise be concurrently used in the production of the polyesters, enable the properties of the subsequently formed copolymers to be varied within wide limits. Ethylene glycol, butandiol-1,3- and propylene glycol-1,2, are the polyhydric alcohols which have generally been used. The unsaturated polyesters thus produced by thermal condensation are mixed with the ethylenic monomers and copolymerized, if necessary, in the presence of polymerization catalysts.

Another process for the production of polyesters consists in forming prepolymers by reaction of ethylenically unsaturated polyesters carrying free hydroxyl groups with diisocyanates or other polyisocyanates, in which case especially water-resistant final polymers are obtained after the copolymerization with the aforementioned monomers has taken place.

However, when the copolymerization of the unsaturated polyesters is carried out with allyl or vinyl compounds, the polymerization is so strongly inhibited at the boundary surface between polyester and air that the surfaces remain tacky. This disadvantage becomes particularly apparent in thin layers, so that these combinations cannot be used as lacquers.

It has now been found that air-drying copolymers can be obtained in a simple and economic manner if, in the production of copolymers from liquid ethylenic monomers and unsaturated copolymerizable polyesters, the polyesters used are ethylenically unsaturated polyesters which are produced with the concurrent use of monohydric or polyhydric alcohols or acids which contain the grouping

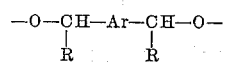

one or more times, in which O is the oxygen of an ether group, Ar is a ring system of aromatic nature and R is a hydrogen atom or an alkyl, such as methyl, propyl, butyl, aralkyl, such as benzyl, aryl, such as phenyl, diphenyl, diphenylether, or cycloalkyl radical, such as cyclohexyl, cyclopentyl.

It is also possible to use polyesters which contain the grouping $$-\text{O}-\underset{\underset{\text{R}}{|}}{\text{CH}}-\text{Ar}-\underset{\underset{\text{R}}{|}}{\text{CH}}-\text{O}-$$

one or more times.

Examples of ring systems of aromatic nature which contain the said grouping are: phenyl, naphthyl, diphenyl, furyl, anthraquinone and diphenyl ether, diphenylsulfone.

Examples of compounds which contain the aforementioned groups and are suitable for the production of the polyesters in accordance with the invention are mono- and polyhydric alcohols which are etherified with benzylalcohol or derivatives of benzylalcohol, such as β-Hydroxyethyl benzyl ether

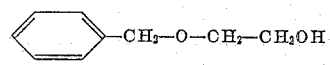

β-Hydroxyethyl-C-methyl-benzyl ether

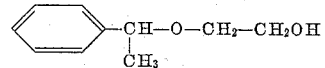

1,4-phenylene-bis-(β-hydroxyethyl methyl ether)

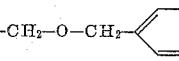

the condensation products of 1 mol of benzyl alcohol and 1 mol of trimethylol propane or 2 mols of benzyl alcohol and 1 mol of pentaerythritol, of the formulae:

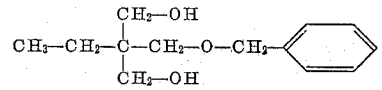

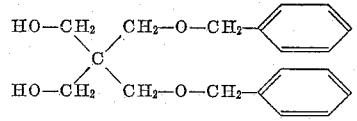

and also aliphatic saturated monocarboxylic acids and dicarboxylic acids containing at least one

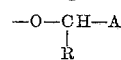

group, such as malic acid monobenzyl ether or tartaric acid dibenzylether of the formulae:

$$\text{C}_6\text{H}_5\text{CH}_2-\text{O}-\underset{\underset{\text{CH}_2.\text{COOH}}{|}}{\text{CH}.\text{COOH}}$$

$$\text{C}_6\text{H}_5\text{CH}_2-\text{O}-\underset{|}{\text{CH}}-\text{COOH}$$
$$\text{C}_6\text{H}_5\text{CH}_2-\text{O}-\underset{|}{\text{CH}}-\text{COOH}$$

These acids may be used together with ethylenically unsaturated dicarboxylic acids for the production of the polyesters.

Compounds of this type will for brevity be referred to as alcoholic and acid benzyl ether derivatives.

Maleic acid, fumaric acid and/or itaconic acid as well as maleic anhydride and itaconic anhydride can be used as ethylenically unsaturated carboxylic acids for the production of the unsaturated polymers. Examples of acids containing no ethylenic or other unsaturation between aliphatically bonded carbon atoms, which may be used in addition to the aforementioned dicarboxylic acids for the preparation of the polyesters are: saturated aliphatic dicarboxylic acids, such as sebacin acid, adipic acid, aromatic dicarboxylic acids, such as phthalic acid, terephthalic acid, tetrachlorophthalic acid, hexachloroendomethylene tetrahydrophthalic acid, as well as anhydrides thereof. In addition to the alcoholic benzyl ether derivatives referred to above, conventional dihydric alcohols, such as for example polymethylene glycols or polyethyleneglycols as for instance ethylene glycol, diethylene glycol or 1,3-butylene glycol, can be concurrently used in the condensation. In this case preferably at least 25 mol percent of the total amount of alcohols consists of alcoholic benzyl ether derivative. In case of alcoholic benzyl ether derivatives which contain two alcoholic groups it is possible to use these without addition of any other polyhydric alcohols.

The polyesters can be produced by thermal or azeotropic esterification at high temperatures (approximately 200° C.), if desired in vacuo according to known methods (compare for instance U.S. specification Nos. 2,255,313 and 2,559,837). The acid number of the polyesters is generally below 60, preferably between 1 and 40 and the hydroxyl number is preferably between 20–80. It is further of advantage to use for the production of 100 parts by weight of polyester at least 10 parts by weight of ethylenically unsaturated dicarboxylic acids.

Polyisocyanate-modified unsaturated polyesters which contain the benzyl ether grouping can be obtained by initially producing unsaturated polyesters which carry free terminal hydroxyl groups. These polyesters containing hydroxyl groups are reacted with such amounts of diisocyanates that polyesters carrying free isocyanate groups are formed, and these polyesters are then reacted with the alcohols having the benzyl ether groupings used in accordance with the invention. However, it is also possible to obtain the polyester by mixing the polyester containing hydroxyl groups with the alcohol used in accordance with the invention and the calculaed amount of diisocyanate and then reacting these components.

Examples of suitable diisocyanates are hexamethylene diisocyanate, toluylene diioscyanate and 4,6-dimethyl-1,3-xylene diisocyanate. The reaction of the polyesters carrying terminal hydroxy groups with the diisocyanates is carried out at 80 to 140° C.

The unsaturated polyesters prepared in accordance with the present invention are dissolved in liquid ethylenic monomers, such as vinyl or allyl compounds and may be polymerized at room temperature in the presence of catalysts, such as peroxides, as for example benzoyl peroxide, cyclohexanone peroxide or cumene peroxide, and heavy metal salts as for example the soluble compounds of cobalt, lead and manganese.

Examples of liquid ethylenic monomers are styrene, acrylic and methacrylic esters, such as esters of acrylic or methacrylic acids with aliphatic and cycloaliphatic alcohols having 1–10 C-atoms, as for instance the methyl-, ethyl-, butyl-, cyclohexyl esters of acrylic or methacrylic acid, vinylacetate, divinyl benzene, diallyl phthalate, and triallyl cyanurate. These compounds are generally applied in amounts of 20–70, preferably 30–50 percent by weight as calculated on the total amount of polyester and monomers.

The copolymerization results in non-tacky products after several hours at room temperature, even in extremely thin layers. At elevated temperature, for example at 50° C., the copolymerization is complete in an extremely short time, the result being non-tacky films. For this reason, the polyester resins used in accordance with the invention are particularly suitable as starting materials for lacquers.

In the following examples the parts are parts by weight.

Example 1

136 parts of pentaerythritol, 220 parts of benzyl alcohol and 0.5 part of p-toluene sulphonic acid are heated while stirring in a fractionation flask at 200° C. until the main amount of the water formed during etherification is distilled off. The pressure is then gradually reduced until a value of 20 mm. is reached. The mixture is now stirred for another 2 hours at 200° C. in vacuo.

In this etherification to give pentaerythritol dibenzyl ether, altogether 38 parts of water distil over.

285 parts of this dibenzyl ether are then mixed with 98 parts of maleic anhydride, 15 parts of diglycol and 220 parts of xylene and esterified azeotropically. When a total of 17 cc. of water has passed over, the xylene is distilled off in vacuo at 140° C. and the polyester is taken up in 255 parts of styrene. Stabilization is effected by addition of 0.07 part of hydroquinone.

100 parts of this solution are then stirred with 4 parts of cyclohexanone peroxide and 0.5 part of cobalt naphthenate. Polymerisation starts after about 5 minutes at room temperature. Thinly applied films are non-tacky after about 6 hours and can be buffed satisfactorily after 24 hours.

Example 2

136 parts of pentaerythritol and 240 parts of benzyl alcohol are etherified with 0.5 part of p-toluene sulphonic acid in accordance with the data given in Example 1. Approximately 38 parts of distillate distil over altogether. After cooling to 100° C., 90 parts of maleic anhydride and 200 parts of xylene are added and the mixture is esterified until 16 cc. of water have distilled over. The xylene is thereafter removed in vacuo at 140° C. and the polyester is taken up in 175 parts of styrene containing 0.07 part of hydroquinone. The polymerization is initiated by adding 4% cyclohexanone peroxide and 0.5% cobalt naphthenate and even in a very thin layer, produces a non-tacky lacquer in a few hours.

Example 3

136 parts of pentaerythritol and 220 parts of benzyl alcohol are etherified with the addition of 0.5 part of p-toluene sulphonic acid and then esterified azeotropically with 150 parts of maleic anhydride, 74 parts of phthalic anhydride, 70 parts of ethylene glycol and 200 parts of xylene. When 39 parts of water have distilled over, the esterification is stopped and the xylene is distilled off in vacuo at 140° C. The polyester which is formed is dissolved in 265 parts of styrene containing 0.1 part of hydroquinone, and polymerised as described with the addition of cyclohexanone peroxide and cobalt naphthenate. Gelling begins after only a few minutes at room temperature. A completely hardened lacquer film is formed within 7 hours and this film can be buffed satisfactorily after 24 hours.

Example 4

136 parts of pentaerythritol and 220 parts of benzyl alcohol are etherified with the addition of 0.5 part of p-toluene sulphonic acid to the dibenzyl ether. The total transfer of water is 36 cc. 118 parts of maleic anhydride, 120 parts of phthalic anhydride and 70 parts of ethylene glycol are then added and the esterification is carried out with the addition of 200 of xylene until a total of 39 parts of water have distilled over. The xylene is thereafter removed in vacuo at 140° C. and the polyester is taken up in 390 parts of styrene containing 0.1 part of hydroquinone. With the use of 4% of cyclohexanone peroxide and 0.5% of cobalt naphthenate, copolymerisation yields a scratch-resisting dry film which is non-tacky after only four hours.

Example 5

The condensation product obtained from 136 parts of pentaerythritol and 220 parts of benzyl alcohol is esterified azeotropically with 100 parts of maleic anhydride, 145 parts of phthalic anhydride and 70 parts of ethylene glycol, with the addition of 200 parts of xylene, until 38 parts of water have distilled over. After the xylene has been distilled off, the polyester is mixed with 0.1 part of hydroquinone and 400 parts of styrene and polymerised in the usual manner with 4% of cyclohexanone peroxide and 0.5% of cobalt naphthenate. The copolymer dried non-tacky within 4 hours, whether it is in the form of a block or in the form of a thin layer.

Example 6

In accordance with the data given in Example 1, 136 parts of pentaerythritol and 220 parts of benzyl alcohol are etherified with the addition of 0.5 part of p-toluene sulphonic acid at 200° C. until 39 cc. of distillate have passed over. After heating has been continued for another 2 hours at 200° C., 131 parts of maleic anhydride, 100 parts of phthalic anhydride, 70 parts of ethylene glycol and 200 parts of xylene are added and the mixture is esterified azeotropically until 40 parts of water/glycol mixture have passed over. The xylene is thereafter removed in vacuo at 140° C., 0.1 part of hydroquinone is added and the polyester is taken up in 390 parts of styrene.

The polyester solution is stirred with 1% of cobalt naphthenate and 4% of cyclohexanone peroxide. Polymerisation starts after about 5 minutes at room temperature and yields a completely non-tacky coating after 5 hours.

*Example 7*

134 parts of trimethylol propane and 110 parts of benzyl alcohol are heated to 200° C. with the addition of 0.3 part of p-toluene sulphonic acid. Water is distilled off with stirring. The pressure is thereafter gradually reduced until a value of 20 mm. is reached, and the temperature is kept for another 2 hours at 200° C. A total of 18 parts of water passes over in this etherification.

After 98 parts of maleic anhydride, 148 parts of phthalic anhydride, 70 parts of ethylene glycol and 200 parts of xylene have been added, the azeotropic esterification is carried out until 38 parts of water/glycol mixture have passed over. After the xylene has been removed in vacuo, the polyester is taken up in 215 parts of styrene containing 0.07 part of hydroquinone.

Polymerisation starts in 5 minutes after 4% of cyclohexanone peroxide and 0.5% of cobalt naphthenate have been incorporated by stirring. Applied lacquer films are dust-dry after about 8 hours.

*Example 8*

226 parts of 1,4-phenylene-bis (β-hydroxyethyl methyl ether), prepared by ading 2 mols of ethylene oxide to 1 mol of p-xylene glycol, are esterified azeotropically with 98 parts of maleic anhydride, 148 parts of phthalic anhydride and 70 parts of ethylene glycol with the addition of 200 parts of xylene until a total of 39 parts of the water/glycol mixture has passed over. The xylene is then distilled off at 140° C., and at a vacuum of 20 mm., and the polyester is mixed with 0.1 part of hydroquinone and taken up in 200 parts of styrene and 140 parts of diallyl phthalate. Copolymerization is carried out in the usual way with cobalt naphthenate and cyclohexanone peroxide. The films produced therefrom are dry after 7 hours.

*Example 9*

A mixture consisting of 226 parts of trimethylolpropane monobenzylether, 232 parts of fumaric acid and 80 parts of glycol is heated while stirring in a fractionation flask at 190° C. in a nitrogen atmosphere until the main amount of the water formed during esterification is distilled off. The pressure is then reduced to 20–30 mm. and the mixture is stirred for another two hours at 190° C. After cooling to 125° C. 0.14 part of hydroquinone and 450 parts of styrene are added.

100 parts of this solution are then stirred with 4 parts of cyclohexanone peroxide, 0.1 part of cobalt naphthenate, whereafter the solution obtained is coated on a support, such as paper, cardboard, glass, wood, metal. The films obtained are dust-free after three hours and can be buffed satisfactorily after 16 hours.

We claim:

1. A polymerizable composition comprising (1) 20–70 parts by weight of styrene, and (2) 30–80 parts by weight of an ethylenically unsaturated polyester prepared by the esterification of (a) an ethylenic-alpha,beta-dicarboxylic acid with (b) pentaerythritol dibenzyl ether of the formula

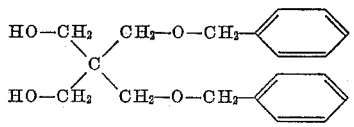

2. Composition of claim 1 wherein said ethylenic-alpha,beta-dicarboxylic acid is selected from the group consisting of maleic anhydride and fumaric acid.

3. A polymerizable composition comprising (1) 20–70 parts by weight of styrene and (2) 30–80 parts by weight of an ethylenically unsaturated polyester prepared by the esterification of (a) an ethylenic-alpha,beta-dicarboxylic acid with (b) pentaerythritol dibenzyl ether having the formula

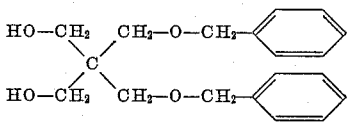

and (c) an aliphatic glycol containing as the sole reactive groups aliphatic hydroxyl groups.

4. Composition of claim 3 wherein said ethylenic-alpha,beta-dicarboxylic acid is selected from the group consisting of maleic anhydride and fumaric acid.

5. A polymerizable composition comprising (1) 20–70 parts by weight of styrene and (2) 30–80 parts by weight of an ethylenically unsaturated polyester prepared by the esterification of an ethylenic-alpha,beta-dicarboxylic acid with trimethylol propane-monobenzylether of the formula

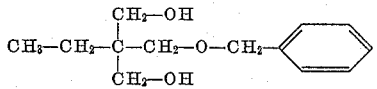

6. Composition of claim 5 wherein said ethylenic-alpha,beta-dicarboxylic acid is selected from the group consisting of maleic anhydride and fumaric acid.

7. A polymerizable composition comprising (1) 20–70 parts by weight of styrene and (2) 30–80 parts by weight of an ethylenically unsaturated polyester prepared by the esterification of an ethylenic-alpha,beta-dicarboxylic acid with (a) trimethylol propane-monobenzylether of the formula

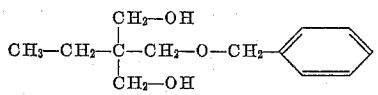

and (b) an aliphatic glycol containing aliphatic hydroxyl groups as the sole reactive groups.

8. Composition of claim 7 wherein said ethylenic-alpha,beta-dicarboxylic acid is selected from the group consisting of maleic anhydride and fumaric acid.

9. A polymerizable composition comprising (1) a normally liquid vinyl monomer, and (2) an ethylenically unsaturated polyester having an acid number lower than 60, said polyester being prepared by the esterification of dicarboxylic acids, at least part of which consist of ethylenic-alpha-beta-dicarboxylic acid, with dihydric alcohols of which at least 25 mol percent consist of a polyhydric alcohol having two hydroxyl groups and at least one further hydroxyl group etherified with benzyl alcohol, said normally liquid vinyl monomer being present in an amount of 20–70% by weight of the total weight of polyester and monomer.

10. The polymerizable composition of claim 9 wherein the etherified polyhydric alcohol is the condensation product of 1 mol of benzyl alcohol and 1 mol of trimethylol propane.

11. The polymerizable composition of claim 9 wherein the etherified polyhydric alcohol is the condensation product of 2 mols of benzyl alcohol and 1 mol of pentaerythritol.

12. A novel lacquer composition comprising (1) 20–70 parts by weight of styrene with (2) 30–80 parts by weight of an ethylenically unsaturated polyester as defined in claim 9, and (3) catalytic amounts of a peroxide catalyst and a metal salt drier, said lacquer composition forming non-tacky films when applied to a surface and air-dried.

References Cited in the file of this patent

UNITED STATES PATENTS

| | | |
|---|---|---|
| 2,255,313 | Ellis | Sept. 9, 1941 |
| 2,443,741 | Kropa | June 22, 1948 |
| 2,687,430 | Snow et al. | Aug. 24, 1954 |
| 2,881,150 | Jaruzelski | Apr. 7, 1959 |